(12) United States Patent
Ye et al.

(10) Patent No.: US 12,184,587 B2
(45) Date of Patent: Dec. 31, 2024

(54) SIGNAL SOURCE IDENTIFICATION AND DETERMINATION

(71) Applicant: NOKIA SOLUTIONS AND NETWORKS OY, Espoo (FI)

(72) Inventors: Huanqiu Ye, Zhejiang (CN); Feifeng Qin, Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/782,802

(22) PCT Filed: May 20, 2020

(86) PCT No.: PCT/CN2020/091335
§ 371 (c)(1),
(2) Date: Jun. 6, 2022

(87) PCT Pub. No.: WO2021/232301
PCT Pub. Date: Nov. 25, 2021

(65) Prior Publication Data
US 2023/0016160 A1      Jan. 19, 2023

(51) Int. Cl.
*H04L 5/00* (2006.01)
*H04B 7/22* (2006.01)
*H04W 16/10* (2009.01)

(52) U.S. Cl.
CPC .............. *H04L 5/0094* (2013.01); *H04B 7/22* (2013.01); *H04L 5/0092* (2013.01); *H04W 16/10* (2013.01)

(58) Field of Classification Search
CPC ....... H04L 5/0094; H04L 5/0092; H04B 7/22; H04W 16/10
See application file for complete search history.

(56) References Cited

U.S. PATENT DOCUMENTS 8,781,045 B2 * 7/2014 Lo .................. H03J 1/005
455/256
8,891,588 B1   11/2014 Hui et al.
(Continued)

FOREIGN PATENT DOCUMENTS

CN     104955044 A    9/2015
CN     105828349 B    4/2019
(Continued)

OTHER PUBLICATIONS

International Search Report and Written Opinion dated Feb. 22, 2021 corresponding to International Patent Application No. PCT/CN2020/091335.
(Continued)

*Primary Examiner* — Shukri Taha
(74) *Attorney, Agent, or Firm* — SQUIRE PATTON BOGGS (US) LLP

(57) ABSTRACT

Embodiments of the present disclosure relate to methods, devices, apparatuses and computer readable storage media for signal source identification and determination. According to embodiments of the present disclosure, in response to detecting a signal, a device identifies at least one unit sequence from the signal. A bandwidth of each unit sequence is a common divisor of overlapping system bandwidths among a plurality of devices. The at least one unit sequence uniquely identifies a further device transmitting the signal. The device determines, based on the at least one unit sequence, the further device from the plurality of devices. As such, a device suffering interference due to atmospheric ducting can find out an interference source and perform an action to avoid the interference.

18 Claims, 6 Drawing Sheets

(56) References Cited

U.S. PATENT DOCUMENTS

| | | | |
|---|---|---|---|
| 8,891,660 B1* | 11/2014 | Wise | H04B 7/0874 |
| | | | 375/267 |
| 2017/0093540 A1 | 3/2017 | Lei et al. | |
| 2017/0142743 A1* | 5/2017 | Yoon | H04W 56/00 |
| 2018/0248680 A1 | 8/2018 | Ji et al. | |
| 2019/0053287 A1 | 2/2019 | Lin et al. | |
| 2019/0222372 A1 | 7/2019 | Guo et al. | |
| 2019/0357239 A1* | 11/2019 | Moon | H04W 76/27 |
| 2020/0022149 A1* | 1/2020 | Beale | H04W 72/53 |

FOREIGN PATENT DOCUMENTS

| | | | |
|---|---|---|---|
| CN | 110235489 A | 9/2019 | |
| CN | 110402552 A | 11/2019 | |
| CN | 110912658 A | 3/2020 | |
| EP | 2512106 A1 | 7/2019 | |
| EP | 3512106 A1 | 7/2019 | |
| WO | 2020/029977 A1 | 2/2020 | |
| WO | WO-2020032731 A1 * | 2/2020 | .......... H04B 7/0456 |
| WO | 2020067952 A1 | 4/2020 | |
| WO | 2020068625 A1 | 4/2020 | |
| WO | 2020092820 A1 | 5/2020 | |

OTHER PUBLICATIONS

CATT, "Remaining issues on Mode 2 resource allocation in NR V2X," R1-2002078, 3GPP TSG RAN WG1 #100bis, e-Meeting, Apr. 30, 2020.

Notification of the First Office Action dated Jun. 26, 2024 corresponding to Chinese Patent Application No. 2020800936674, with English translation thereof.

Office Action dated Dec. 22, 2022, corresponding to India Patent Application No. 202247043625.

Extended Search Report dated Dec. 15, 2022, corresponding to European Patent Application No. 20936542.8.

* cited by examiner

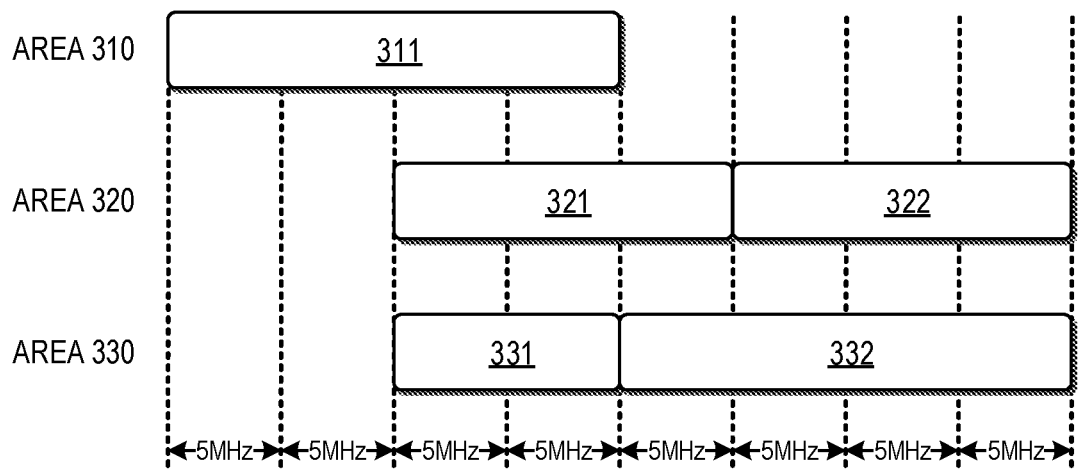
Fig. 3A
| OVERLAPPING BANDWIDTHS | 311 | 321 | 322 | 331 | 332 |
|---|---|---|---|---|---|
| 311 | | 10MHz | | 10MHz | |
| 321 | 10MHz | | | 10MHz | 5MHz |
| 322 | | | | | 15MHz |
| 331 | 10MHz | 10MHz | | | |
| 332 | | 5MHz | 15MHz | | |
Fig. 3B
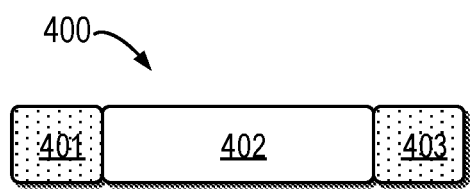
Fig. 4

SIGNAL SOURCE IDENTIFICATION AND DETERMINATION

TECHNICAL FIELD

Embodiments of the present disclosure generally relate to the field of telecommunications, and in particular, to methods, devices, apparatuses and computer readable storage media for signal source identification and determination.

BACKGROUND

Atmospheric ducting is a mode of propagation of electromagnetic radiation, usually in lower layers of the Earth's atmosphere, where the waves are bent by atmospheric refraction. In case of atmospheric ducting, a downlink signal of a network device (for example, an Evolved NodeB) may degrade too little to be ignored by a remote network device (for example, another Evolved NodeB). In this case, remote interference between network devices occurs.

SUMMARY

In general, example embodiments of the present disclosure provide methods, devices, apparatuses and computer readable storage media for signal source identification and determination.

In a first aspect, there is provided a method for identifying a signal source. The method comprises transmitting, from a device, at least one unit sequence to a further device, wherein a bandwidth of each unit sequence is a common divisor of comprehensive overlapping system bandwidths among a plurality of devices and the at least one unit sequence uniquely identifies the device in the plurality of devices.

In a second aspect, there is provided a method for determining a signal source. The method comprises in response to detecting a signal at a device, identifying at least one unit sequence from the signal, wherein a bandwidth of each unit sequence is a common divisor of overlapping system bandwidths among a plurality of devices and the at least one unit sequence uniquely identifies a further device transmitting the signal; and determining, based on the at least one unit sequence, the further device from the plurality of devices.

In a third aspect, there is provided a device. The device comprises at least one processor and at least one memory including computer program codes. The at least one memory and the computer program codes are configured to, with the at least one processor, cause the device to transmit at least one unit sequence to a further device, wherein a bandwidth of each unit sequence is a common divisor of comprehensive overlapping system bandwidths among a plurality of devices and the at least one unit sequence uniquely identifies the device in the plurality of devices.

In a fourth aspect, there is provided a device. The device comprises at least one processor and at least one memory including computer program codes. The at least one memory and the computer program codes are configured to, with the at least one processor, cause the device to in response to detecting a signal, identify at least one unit sequence from the signal, wherein a bandwidth of each unit sequence is a common divisor of comprehensive overlapping system bandwidths among a plurality of devices and the at least one unit sequence uniquely identifies a further device transmitting the signal; and determine, based on the at least one unit sequence, the further device from the plurality of devices.

In a fifth aspect, there is provided an apparatus. The apparatus comprises means for transmitting, from a device, at least one unit sequence to a further device, wherein a bandwidth of each unit sequence is a common divisor of comprehensive overlapping system bandwidths among a plurality of devices and the at least one unit sequence uniquely identifies the device in the plurality of devices.

In an sixth aspect, there is provided an apparatus. The apparatus comprises means for in response to detecting a signal at a device, identifying at least one unit sequence from the signal, wherein a bandwidth of each unit sequence is a common divisor of comprehensive overlapping system bandwidths among a plurality of devices and the at least one unit sequence uniquely identifies a further device transmitting the signal; and means for determining, based on the at least one unit sequence, the further device from the plurality of devices.

In a seventh aspect, there is provided a computer program product that is stored on a computer readable medium and includes machine-executable instructions. The machine-executable instructions, when being executed, cause a machine to perform the method according to the above first or second aspect.

In an eighth aspect, there is a computer readable storage medium comprising program instructions stored thereon. The instructions, when executed by an apparatus, cause the apparatus to perform the method according to the above first or second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein:

FIGS. 3A and 3B show diagrams of an example for determining a bandwidth of a unit sequence based on overlapping system bandwidths among network devices in accordance with some example embodiments of the present disclosure;

FIG. 4 shows a diagram of an example unit sequence in accordance with some example embodiments of the present disclosure;

Throughout the drawings, the same or similar reference numerals represent the same or similar element.

DETAILED DESCRIPTION

Figure 1:
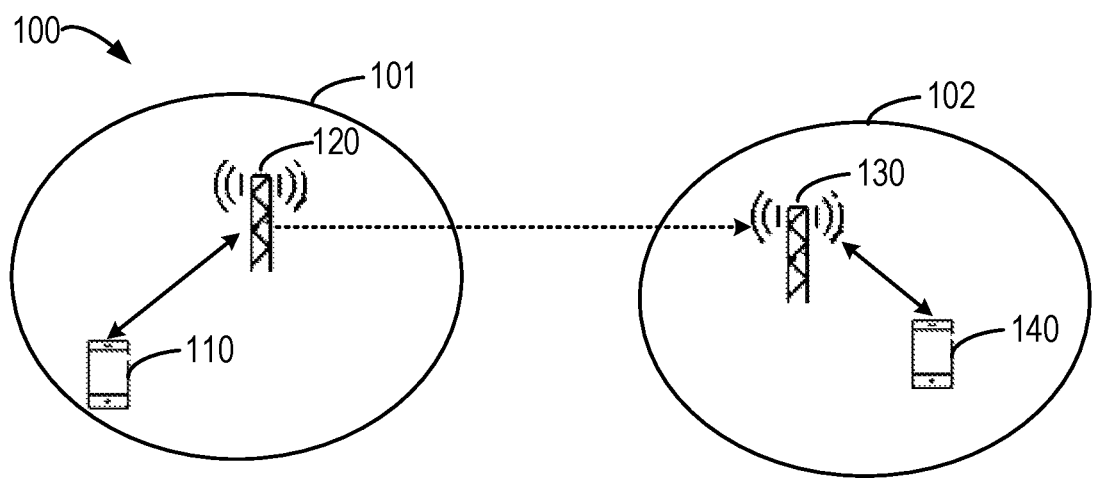
FIG. 1 shows an example communication network in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Time Division-Long Term Evolution (TD-LTE), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IOT device or fixed IOT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

Atmospheric ducting is a mode of propagation of electromagnetic radiation, usually in lower layers of the Earth's atmosphere, where the waves are bent by atmospheric refraction. In case of atmospheric ducting, a downlink signal of a network device may degrade too little to be ignored by a remote network device. In this case, remote interference between network devices occurs.

Some legacy solution proposes that each network device belonging to a same operator transmits a specific sequence which uniquely identifies the network device. As such, if a network device detects an interference signal from another network device, the network device may identify the specific sequence from the interference signal and then identify the other network device interfering with the network device based on the determined sequence. However, the legacy solution requires that all of the network devices use a same bandwidth and same frequency carriers. Otherwise, the network devices cannot identify each other and thus the interference source cannot be identified.

In some case, the operator spectrum deployment may be complex. Even for a same operator, the bandwidth and frequency carriers used by network devices in different areas may be not the same. In this event, the legacy solution will not be applicable.

Embodiments of the present disclosure provide a solution for signal source identification and determination, so as to solve the above problem and one or more of other potential problems. According to embodiments of the present disclosure, a device may transmit at least one unit sequence, where a bandwidth of each unit sequence is a common divisor of comprehensive overlapping system bandwidths among a plurality of devices and the at least one unit sequence uniquely identifies the device in the plurality of devices. On the other hand, if a device detects a signal, the device may identify at least one unit sequence from the signal, where a bandwidth of each unit sequence is a common divisor of comprehensive overlapping system bandwidths among a plurality of devices and the at least one unit sequence uniquely identifies a further device transmitting the signal. The device may determine, based on the at least one unit sequence, the further device from the plurality of devices.

As such, a device suffering interference due to atmospheric ducting can find out an interference source and perform an action to avoid the interference, without requiring all of the devices to use a same bandwidth and same frequency carriers.

FIG. 1 shows an example communication network 100 in which implementations of the present disclosure can be implemented. The communication network 100 includes devices 110, 120, 130 and 140. In this example, the devices 110 and 140 are illustrated as terminal devices and the devices 120 and 130 are illustrated as network devices. The device 120 may provide one or more serving cells 101 to serve terminal devices, for example, the device 110. The device 130 may provide one or more serving cells 102 to serve terminal devices, for example, the device 140. In some example embodiments, the network devices 120 and 130 may belong to a same operator. Alternatively, the network devices 120 and 130 may belong to different operators.

It is to be understood that the numbers of network devices, terminal devices and serving cells are shown only for the purpose of illustration without suggesting any limitations. The network 100 may include any suitable number of network devices, terminal devices and serving cells adapted for implementing embodiments of the present disclosure. In the following, only for the purpose of illustration, the devices 110 and 140 are also referred to as terminal device 110 and 140, respectively. The devices 120 and 130 are also referred to as network devices 120 and 130, respectively.

In the communication network 100, the network device 120 can communicate data and control information to the terminal device 110 and the terminal device 110 can also communication data and control information to the network device 120. The network device 130 can communicate data and control information to the terminal device 140 and the terminal device 140 can also communication data and control information to the network device 130. A link from the network device to the terminal device is referred to as a downlink (DL) or a forward link, while a link from the terminal device to the network device is referred to as an uplink (UL) or a reverse link.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

In case of atmospheric ducting, for example, a signal transmitted by the device 120 may degrade too little to be ignored by the device 130. In this case, remote interference between the devices 120 and 130 occurs. In order to enable the device 130 to identify the interference source (for example, the device 120), the device 120 may transmit a specific sequence that uniquely identifies the device 120. In response to detecting a signal from the device 120, the device 130 can identify the specific sequence from the signal and then determine the signal source (for example, the network device 120) based on the identified sequence.

Figure 2:
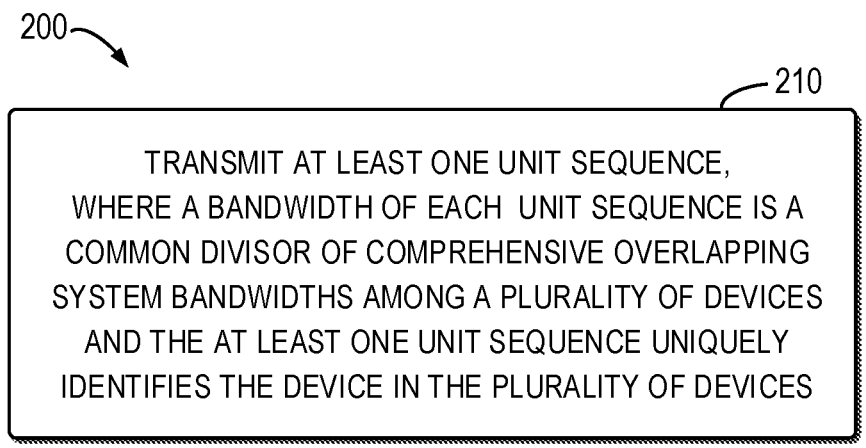
FIG. 2 shows a flowchart of an example method for identifying a signal source in accordance with some example embodiments of the present disclosure.

FIG. 2 shows a flowchart of a method 200 for identifying a signal source in accordance with some example embodiments of the present disclosure. For example, the method 200 can be implemented at the device 120 as shown in FIG. 1. It is to be understood that the method 200 may include additional blocks not shown and/or may omit some shown blocks, and the scope of the present disclosure is not limited in this regard.

At block 210, the device 120 transmits at least one unit sequence to a further device (for example, the device 110 and/or 130), where a bandwidth of each unit sequence is a common divisor of comprehensive overlapping system bandwidths among a plurality of devices and the at least one unit sequence uniquely identifies the device in the plurality of devices.

In some example embodiments, a plurality of unit sequences may be generated and stored at the device 120 for identifying the plurality of devices. The device 120 may selects, from the plurality of unit sequences, at least one unit sequence that uniquely identifies the device 120 in the plurality of devices.

In some example embodiments, the number of unit sequences to be generated may depend on the number of network devices or cells to be identified. For example, if there are 8 network devices or cells to be identified, 8 unit sequences may be generated. Alternatively, if the device 120 can transmit two different signals generated from two different unit sequences in two different sub-frames, 8 unit sequences can be used to identify 64 network devices or cells.

In some example embodiments, the network device 120 may belong to an operator. In some example embodiments, a bandwidth of each unit sequence to be generated may be a common divisor of comprehensive overlapping system bandwidths among a plurality of cells in the operator's network. An overlapping system bandwidth refers to the overlapping part of system bandwidths of any two of the plurality of network devices or cells. The comprehensive overlapping system bandwidths refer to a collection of overlapping system bandwidths among the plurality of network devices or cells in the operator's network. For example, the bandwidth of each unit sequence may equal to the greatest common divisor of the overlapping system bandwidths among the plurality of cells. Moreover, the bandwidth of each unit sequence can be divided by respective system bandwidths of the plurality of cells.

FIGS. 3A and 3B show diagrams of an example for determining a bandwidth of a unit sequence based on overlapping bandwidths among network devices in accordance with some example embodiments of the present disclosure.

As shown in FIG. 3A, for example, an operator may deploy network devices in different areas 310, 320 and 330. The network device deployed in the area 310 may provide a cell 311. The system bandwidth of the cell 311 may be 20 MHz. For example, the cell 311 is configured with frequency carriers in 2320 MHz-2340 MHz. The network device(s) deployed in the area 320 may provide cells 321 and 322. The system bandwidth of the cell 321 may be 15 MHz. For example, the cell 321 is configured with frequency carriers in 2330 MHz-2345 MHz. The system bandwidth of the cell 322 may be 15 MHz. For example, the cell 322 is configured with frequency carriers in 2345 MHz-2360 MHz. The network device(s) deployed in the area 330 may provide cells 331 and 332. The system bandwidth of the cell 331 may be 10 MHz. For example, the cell 331 is configured with frequency carriers in 2330 MHz-2340 MHz. The system bandwidth of the cell 332 may be 20 MHz. For example, the cell 332 is configured with frequency carriers in 2340 MHz-2360 MHz.

According to the above spectrum deployment, there are overlapping system bandwidths among the cells 311, 321, 322, 331 and 332, as shown in FIG. 3B. For example, the overlapping bandwidth between the cells 311 and 321 is 10 MHz. The overlapping bandwidth between the cells 311 and 331 is 10 MHz. The overlapping bandwidth between the cells 321 and 331 is 10 MHz. The overlapping bandwidth between the cells 321 and 332 is 5 MHz. The overlapping bandwidth between the cells 322 and 332 is 15 MHz. The greatest common divisor of the overlapping system bandwidths among the cells is 5 MHz. Moreover, 5 MHz can be divided by respective system bandwidths of the cells. As such, 5 MHz can be determined as the bandwidth of the unit sequence.

FIG. 4 shows a diagram of a unit sequence 400 in accordance with some example embodiments of the present disclosure. As shown in FIG. 4, the bandwidth of the unit sequence 400 is split into two guard band parts 401 and 403 at both sides and one sequence part 402 in the middle.

In some example embodiments, the bandwidth of the guard band can be determined based on the maximum guard band from all of system bandwidth options in the operator's network. For example, in TD-LTE cells, there are 3 system bandwidth options 10 MHz, 15 MHz and 20 MHz, among which 1 MHz guard band per side from the 20 MHz system bandwidth option is the maximum one. As such, 1 MHz guard band per side can be applied to the unit sequence 400. That is, if the bandwidth of the unit sequence 400 is determined as 5 MHz, the bandwidth of each of the guard band parts 401 and 403 may be 1 MHz and the bandwidth of the sequence part 402 may be 3 MHz.

In some example embodiments, the length of the sequence part 402 and the length of the guard band parts 401 and 403 may be in units of subcarriers. In some example embodiments, the number of subcarriers configured for the guard band may follow principles as below: (1) the accumulated bandwidth of subcarriers configured for a guard band should be not lower than the above determined bandwidth of the guard band; and (2) after configuring subcarriers for the guard band, the bandwidth of subcarriers configured for the sequence part should not exceed the above determined bandwidth of the sequence part. For example, if 1 MHz is used as the bandwidth of the guard band per side and if a subcarrier interval in the system is 15 KHz, the length of the guard band part 401 or 403 may be not lower than 67. If each of the guard band parts 401 and 403 has a length of 67, the bandwidth of the sequence part 402 may be at most 2.99 MHz (that is, 5 MHz-15 KHz*67*2). Thus, the sequence part 402 may have a length of 199 (that is, 2.99 MHz/15 KHz).

In some example embodiments, if the bandwidth of a unit sequence locates at the edge of the system bandwidth, the guard band of the unit sequence may exclude the system guard band part at the edge of system bandwidth. For example, if the bandwidth of a unit sequence locates at the highest edge of the 10 MHz system bandwidth, since there is a 500 KHz guard band at that side, the guard band of the unit sequence may only occupy a bandwidth of 500 KHz (that is, 1 MHz-500 KHz) and at least 34 subcarriers.

In some example embodiments, the sequence part 402 may be derived from a pre-determined sequence. For example, the pre-determined sequence may be a Gold sequence, a Zadoff-Chu sequence, or any other sequence. In some example embodiments, after applying Binary Phase Shift Keying (BPSK) modulation, Fast Fourier Transform (FFT) and zero padding to the pre-determined sequence, the modulated sequence part can be generated as:

$$X_{ID}(m), \text{ where } m=0,1,2\ldots(N_{length}-1) \quad (1)$$

where ID represents an identifier allocated for each unit sequence. For example, if 8 sequences are generated, then ID=0, 1, 2 . . . 7. $N_{length}$ represents the sequence length of the unit sequence. For example, in the above example, $N_{length}$=199. In some example embodiments, by applying inverse FFT (iFFT), Circle Prefix (CP) Insertion and ½ subcarrier offset to the modulated sequence part as shown in the above formula (1), the sequence part 402 can be generated.

As such, the plurality of unit sequences can be generated. In some example embodiments, the device 120 may select, from the plurality of unit sequences, the at least one unit sequence uniquely identifying the device in the operator's network.

In some example embodiments, the device 120 may determine, based on an identifier of the device, at least one sequence identifier of the at least one unit sequence. The device 120 may select, based on the at least one sequence identifier, the at least one unit sequence from the plurality of unit sequences.

In some example embodiments, if the device 120 can transmit two different signals generated from two different unit sequences in two different sub-frames, the device 120 may determine, based on an identifier of the device, a first sequence identifier and a second sequence identifier which uniquely identify the device 120. The device 120 may select, based on the first and second sequence identifiers, a first unit sequence and a second unit sequence from the plurality of unit sequences.

In some example embodiments, in order to transmit the at least one sequence, the device 120 may generate, based on the bandwidth of each unit sequence and a system bandwidth of the device 120, at least one signal by assembling the at least one unit sequence. Then, the device 120 may transmit the at least one signal to the further device (for example, the device 110 and/or 130).

In some example embodiments, the at least one unit sequence may comprise only one unit sequence. The device 120 may generate a signal by assembling a number of the unit sequences, where the number is determined by dividing the system bandwidth of the device 120 by the bandwidth of each unit sequence. The device 120 may then transmit the generated signal to the further device (for example, the device 110 and/or 130).

Figure 5:
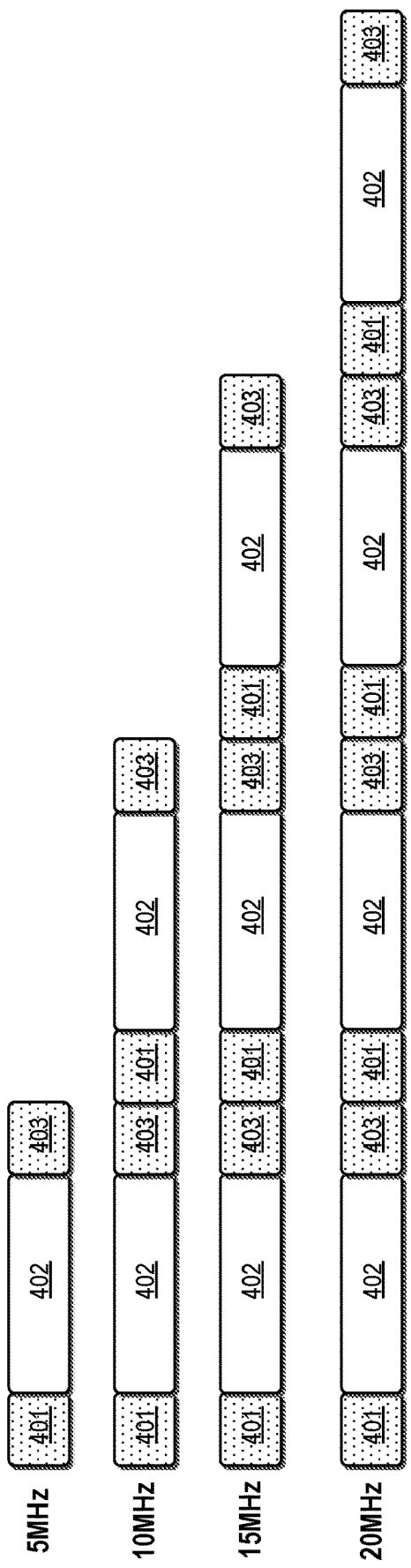
FIG. 5 shows diagrams of examples for generate a signal by assembling a unit sequence in accordance with some example embodiments of the present disclosure.

FIG. 5 shows diagrams of examples for generate a signal by assembling a unit sequence in accordance with some example embodiments of the present disclosure. As shown in FIG. 5, if the bandwidth of one unit sequence is 5 MHz and the system bandwidth is 5 MHz, then the signal can be generated by assembling only one unit sequence. If the bandwidth of one unit sequence is 5 MHz and the system bandwidth is 10 MHz, then the signal can be generated by assembling two unit sequences. If the bandwidth of one unit sequence is 5 MHz and the system bandwidth is 15 MHz, then the signal can be generated by assembling three unit sequences. If the bandwidth of one unit sequence is 5 MHz and the system bandwidth is 20 MHz, then the signal can be generated by assembling four unit sequences.

In some example embodiments, if the device 120 can transmit two different signals generated from two different unit sequences in two different sub-frames, the device 120 may select the first unit sequence and the second unit sequence from the plurality of unit sequences. The device 120 may generate, by assembling a number of the first unit sequences, a first signal to be transmitted in a first sub-frame, where the number is determined by dividing the system bandwidth of the device by the bandwidth of each unit sequence. The device 120 may generate, by assembling the number of the second unit sequences, a second signal to be transmitted in a second sub-frame. Then, the device 120 may transmit the first signal to the further device in the first sub-frame and transmit the second signal to the further device in the second sub-frame.

In some example embodiments, in a TDD LTE network, the at least one signal comprising the at least one unit sequence may be transmitted in any of the following: a Downlink Pilot Time Slot (DwPTS), an Uplink Pilot Time Slot (UpPTS), a Guard Period (GP), or a traffic time slot of a sub-frame. In some example embodiments, in a FDD LTE network, if there is overlap between downlink and uplink bandwidths of different operators in some scenario, the at least one signal comprising the at least one unit sequence may be transmitted in any suitable position in the frame pattern of the device 120.

In some example embodiments, the device 120 may determine a proper timing position in its frame pattern to transmit the at least one signal comprising the at least one unit sequence. The timing position can facilitate another device (for example, the device 130) to determine its distance from the device 120. In some example embodiments, the other device (for example, the device 130) can determine its distance from the device 120 as following:

$$\text{Distance}=(P1-P0)*V \quad (2)$$

where P1 represents the timing position at which the at least one signal is detected, P0 represents the timing position at which the at least one signal is transmitted, and V represents the speed of the signal in atmospheric ducting. For example, the device 120 may transmit the at least one signal comprising the at least one unit sequence at the head of its Guard Period (GP), i.e., in the No. 11 symbol of its specific sub-frame. The other device (for example, the device 130) can detect the at least one signal comprising the at least one unit sequence in the same sub-frame. For example, if each symbol lasts nearly 71 us, and the signal speed in atmospheric ducting is nearly 0.2 km/us, the other device (for example, the device 130) can determine its distance from the device 120 as below: (14−11)*71 us*0.2 km/us=42.6 km.

In some example embodiments, the plurality of unit sequences may be stored by each of network devices in an operator's network. As such, if a network device detects an interference signal, the network device may determine the unit sequence comprised in the interference signal from the plurality of unit sequences and identify the signal source based on the determined unit sequence. Alternatively, or in addition, in some example embodiments, different operators may correspond to different sets of unit sequences. A network device can store different sets of unit sequences corresponding to different operators, and thus can identify an interference source belong to other operators.

Figure 6:
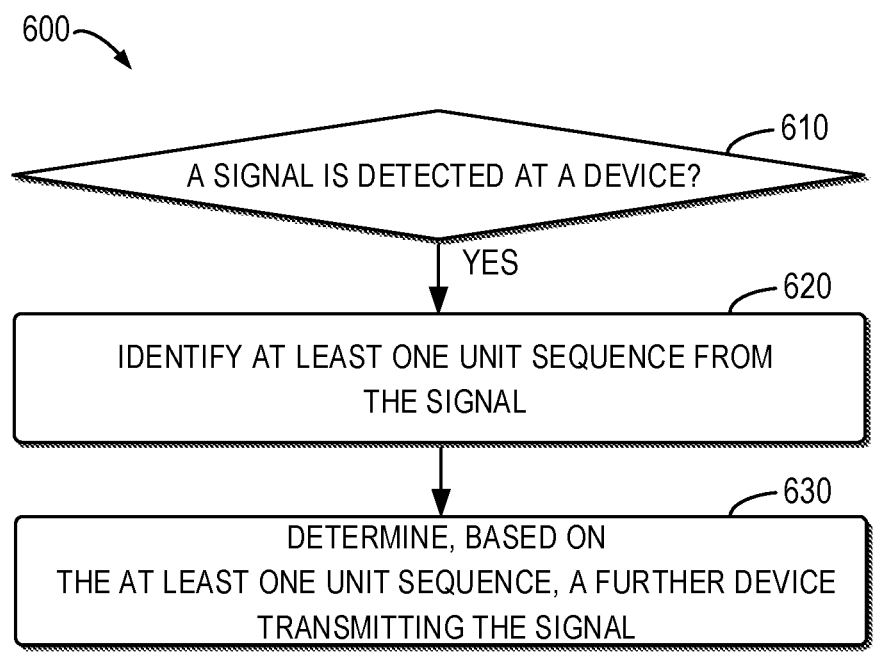
FIG. 6 shows a flowchart of an example method for determining a signal source in accordance with some example embodiments of the present disclosure.

FIG. 6 shows a flowchart of an example method 600 for signal source determination in accordance with some example embodiments of the present disclosure. The method 600 can be implemented at the device 130 as shown in FIG. 1. It is to be understood that the method 600 may include additional blocks not shown and/or may omit some shown blocks, and the scope of the present disclosure is not limited in this regard.

At block 610, the device 130 determines if a signal (for example, an interference signal) is detected. In response to the signal being detected, at block 620, the device 130 identifies at least one unit sequence from the signal. A bandwidth of each unit sequence may be a common divisor of comprehensive overlapping system bandwidths among a plurality of devices in an operator's network.

In some example embodiments, the device 130 may be included in the plurality of devices. Alternatively, the device 130 and the plurality of devices may belong to different operators.

In some example embodiments, in a TDD LTE network, the signal may be detected in any of the following: a Downlink Pilot Time Slot (DwPTS), an Uplink Pilot Time Slot (UpPTS), a Guard Period (GP), or a traffic time slot of a sub-frame. In some example embodiments, in a FDD LTE network, if there is overlap between downlink and uplink bandwidths of different operators in some scenario, the signal may be detected in any suitable position in the frame pattern of the device 120.

In some example embodiments, for example, prior to detecting the signal, a plurality of unit sequences for identifying the plurality of devices may be generated and stored at the device 130. The device 130 may determine, from the plurality of unit sequences, the at least one unit sequence comprised in the signal.

In some example embodiments, in order to determine the at least one unit sequence comprised in the signal, the device 130 may divide, based on the bandwidth of each unit sequence, a system bandwidth of the device into at least one segment. The bandwidth of each segment equals to the bandwidth of each unit sequence. The device 130 may determine correlations between the signal and the plurality of unit sequences in each of the at least one segment. In response to a correlation between the signal and a unit sequence of the plurality of unit sequences exceeding a threshold, the device 130 may determine the unit sequence as one of the at least one unit sequence. As such, the device 130 can determine the at least one unit sequence comprised in the signal.

At block 630, the device 130 determines, based on the at least one unit sequence and from the plurality of devices, a further device transmitting the signal. In some example embodiments, the at least one unit sequence may uniquely identify a further device (for example, the device 120) transmitting the signal, which interferes with the device 130. Therefore, the device 130 can determines, based on the at least one unit sequence, the further device from the plurality of devices.

In view of the above, it can be seen that embodiments of the present disclosure provide a solution for signal source identification and determination. According to embodiments of the present disclosure, a device may transmit at least one unit sequence, where a bandwidth of each unit sequence is a common divisor of comprehensive overlapping system bandwidths among a plurality of devices and the at least one unit sequence uniquely identifies the device in the plurality of devices. On the other hand, if a device detects a signal, the device may identify at least one unit sequence from the signal, where a bandwidth of each unit sequence is a common divisor of comprehensive overlapping system bandwidths among a plurality of devices and the at least one unit sequence uniquely identifies a further device transmitting the signal. The device may determine, based on the at least one unit sequence, the further device from the plurality of devices.

As such, a device suffering interference due to atmospheric ducting can find out an interference source and perform an action to avoid the interference, without requiring all of the devices to use a same bandwidth and same frequency carriers.

In some example embodiments, an apparatus capable of performing the method 200 may comprise means for performing the respective steps of the method 200. The means may be implemented in any suitable form. For example, the means may be implemented in a circuitry or software module.

In some example embodiments, the apparatus capable of performing the method 200 (for example, the device 120) comprises means for transmitting, from a device, at least one unit sequence to a further device, wherein a bandwidth of each unit sequence is a common divisor of comprehensive overlapping system bandwidths among a plurality of devices and the at least one unit sequence uniquely identifies the device in the plurality of devices.

In some example embodiments, the means for transmitting the at least one unit sequence comprises: means for generating, based on the bandwidth of each unit sequence and a system bandwidth of the device, at least one signal by assembling the at least one unit sequence; and means for transmitting the at least one signal to the further device.

In some example embodiments, the at least one unit sequence comprises a first unit sequence. The means for generating the at least one signal comprises: means for generating a signal by assembling a number of the first unit sequences, the number determined by dividing the system bandwidth of the device by the bandwidth of each unit sequence.

In some example embodiments, the at least one unit sequence comprises a first unit sequence and a second unit sequence. The means for generating the at least one signal comprises: means for generating, by assembling a number of the first unit sequences, a first signal to be transmitted in a first sub-frame, the number determined by dividing the system bandwidth of the device by the bandwidth of each unit sequence; and means for generating, by assembling the number of the second unit sequences, a second signal to be transmitted in a second sub-frame.

In some example embodiments, the means for transmitting the at least one signal to the further device comprises: means for transmitting the first signal to the further device in the first sub-frame; and means for transmitting the second signal to the further device in the second sub-frame.

In some example embodiments, the apparatus capable of performing the method 200 further comprises: means for generating a plurality of unit sequences for identifying the plurality of devices; means for determining, based on an identifier of the device, at least one sequence identifier of the at least one unit sequence; and means for selecting, based on the at least one sequence identifier, the at least one unit sequence from a plurality of unit sequences.

In some example embodiments, the means for generating the plurality of unit sequences comprises: means for allocating a sequence identifier for a unit sequence of the plurality of unit sequences; means for determining the bandwidth of the unit sequence based on the common divisor of the comprehensive overlapping system bandwidths among the plurality of devices; means for determining, based on the bandwidth and a sub-carrier interval, a sequence length of the unit sequence; and means for generating, based on a pre-determined sequence and the sequence identifier, the unit sequence having the bandwidth and the sequence length.

In some example embodiments, the pre-determined sequence comprises any of the following: a gold sequence and a Zadoff-Chu sequence.

In some example embodiments, each of the plurality of unit sequences comprises two guard band parts and a sequence part between the two guard band parts.

In some example embodiments, the device is a network device and the plurality of devices comprising the device are a plurality of network devices belonging to a same operator.

In some example embodiments, the at least one sequence is transmitted in a TDD communication system in any of the following: a Downlink Pilot Time Slot; an Uplink Pilot Time Slot; a Guard Period; and a traffic time slot.

In some example embodiments, an apparatus capable of performing the method 600 may comprise means for performing the respective steps of the method 600. The means may be implemented in any suitable form. For example, the means may be implemented in a circuitry or software module.

In some example embodiments, the apparatus capable of performing the method 600 (for example, the device 130) comprises: means for in response to detecting a signal at a device, identifying at least one unit sequence from the signal, wherein a bandwidth of each unit sequence is a common divisor of comprehensive overlapping system bandwidths among a plurality of devices and the at least one unit sequence uniquely identifies a further device transmitting the signal; and means for determining, based on the at least one unit sequence, the further device from the plurality of devices.

In some example embodiments, the means for identifying the at least one unit sequence comprises: means for dividing, based on the bandwidth of each unit sequence, a system bandwidth of the device into at least one segment; means for determining, in each of the at least one segment, correlations between the signal and a plurality of unit sequences stored at the device; and means for in response to a correlation between the signal and a unit sequence of the plurality of unit sequences exceeding a threshold, determining the unit sequence as one of the at least one unit sequence.

In some example embodiments, the device is a network device, the further device is a further network device and the plurality of devices are a plurality of network devices comprising the further network device.

In some example embodiments, the plurality of devices comprise the device and belong to a same operator.

In some example embodiments, the plurality of devices belong to a first operator and the device belongs to a second operator different from the first operator.

In some example embodiments, the signal is detected in a TDD communication system in any of the following: a Downlink Pilot Time Slot; an Uplink Pilot Time Slot; a Guard Period; and a traffic time slot.

Figure 7:
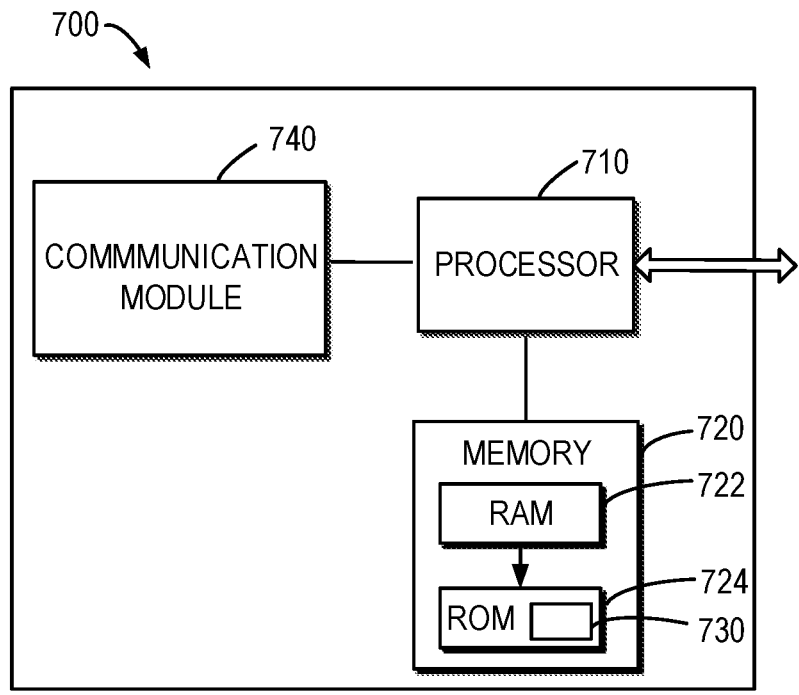
FIG. 7 illustrates a simplified block diagram of an apparatus that is suitable for implementing embodiments of the present disclosure.

FIG. 7 is a simplified block diagram of a device 700 that is suitable for implementing embodiments of the present disclosure. For example, the devices 110, 120 and/or 130 as shown in FIG. 1 can be implemented by the device 700. As shown, the device 700 includes one or more processors 710, one or more memories 720 coupled to the processor 710, and one or more communication modules 740 coupled to the processor 710.

The communication module 740 is for bidirectional communications. The communication module 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 724. The processor 710 may perform any suitable actions and processing by loading the program 730 into the RAM 722.

The embodiments of the present disclosure may be implemented by means of the program 730 so that the device 700 may perform any process of the disclosure as discussed with reference to FIGS. 2 and 6. The embodiments of the present disclosure may also be implemented by hardware or by a combination of software and hardware.

Figure 8:
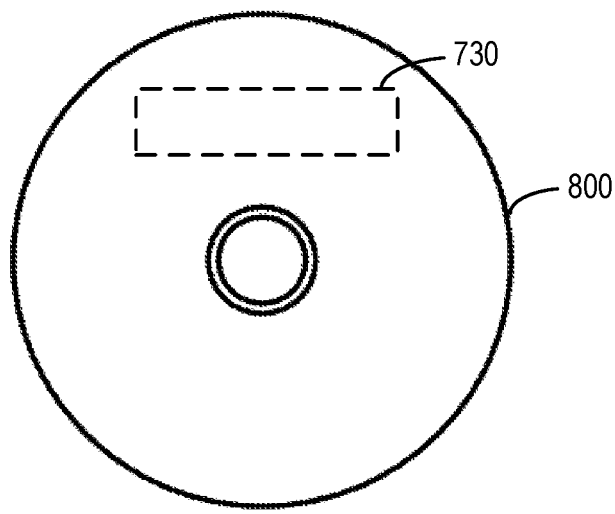
FIG. 8 illustrates a block diagram of an example computer readable medium in accordance with some example embodiments of the present disclosure.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the apparatus 700 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the apparatus 700 may be instead comprised in the distributed unit, and at least some of the described processes may be performed by the distributed unit.

In an embodiment, the execution of at least some of the functionalities of the apparatus 700 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the apparatus 700 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200 as described above with reference to FIG. 2 and/or the method 600 as described above with reference to FIG. 6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for identifying a signal source, said method comprising:
   transmitting, from a base station, at least one unit sequence to a device,
   wherein a bandwidth of each unit sequence is equal to a divisor which is common to each system bandwidth among overlapping system bandwidths of a plurality of base stations and the at least one unit sequence uniquely identifies the base station in the plurality of base stations.

2. The method of claim 1, wherein transmitting the at least one unit sequence comprises:
   generating, based on the bandwidth of each unit sequence and a system bandwidth of the base station, at least one signal by assembling the at least one unit sequence; and
   transmitting the at least one signal to the device.

3. The method of claim 2, wherein the at least one unit sequence comprises a first unit sequence, and generating the at least one signal comprises:
   generating a signal by assembling a number of the first unit sequences, the number determined by dividing the system bandwidth of the base station by the bandwidth of each unit sequence.

4. The method of claim 2, wherein the at least one unit sequence comprises a first unit sequence and a second unit sequence, and generating the at least one signal comprises:
   generating, by assembling a number of the first unit sequences, a first signal to be transmitted in a first sub-frame, the number determined by dividing the system bandwidth of the base station by the bandwidth of each unit sequence; and
   generating, by assembling the number of the second unit sequences, a second signal to be transmitted in a second sub-frame.

5. The method of claim 4, wherein transmitting the at least one signal to the device comprises:
   transmitting the first signal to the device in the first sub-frame; and
   transmitting the second signal to the device in the second sub-frame.

6. The method of claim 1, further comprising:
   generating a plurality of unit sequences for identifying the plurality of base stations, wherein each of the plurality of unit sequences comprises two guard band parts and a sequence part between the two guard band parts;
   determining, based on an identifier of the base station, at least one sequence identifier of the at least one unit sequence; and
   selecting, based on the at least one sequence identifier, the at least one unit sequence from a plurality of unit sequences.

7. The method of claim 6, where generating the plurality of unit sequences comprises:
   allocating a sequence identifier for a unit sequence of the plurality of unit sequences;
   determining the bandwidth of the unit sequence based on the common divisor of the comprehensive overlapping system bandwidths among the plurality of base stations;
   determining, based on the bandwidth and a sub-carrier interval, a sequence length of the unit sequence; and
   generating, based on a pre-determined sequence and the sequence identifier, the unit sequence having the bandwidth and the sequence length.

8. The method of claim 7, wherein the pre-determined sequence comprises any of the following: a gold sequence and a Zadoff-Chu sequence.

9. The method of claim 1, wherein the at least one sequence is transmitted in a Time Divided Duplexer communication system in any of the following:
   a Downlink Pilot Time Slot;
   an Uplink Pilot Time Slot;
   a Guard Period; and
   a traffic time slot.

10. A method for determining a signal source, said method comprising:
    in response to detecting a signal at a base station, identifying at least one unit sequence from the signal,
    wherein a bandwidth of each unit sequence is equal to a divisor which is common to each system bandwidth among overlapping system bandwidths of a plurality of base stations and the at least one unit sequence uniquely identifies a further base station transmitting the signal; and
    determining, based on the at least one unit sequence, the further base station from the plurality of base stations.

11. The method of claim 10, wherein identifying the at least one unit sequence comprises:
    dividing, based on the bandwidth of each unit sequence, a system bandwidth of the base station into at least one segment;
    determining, in each of the at least one segment, correlations between the signal and a plurality of unit sequences stored at the base station; and
    in response to a correlation between the signal and a unit sequence of the plurality of unit sequences exceeding a threshold, determining the unit sequence as one of the at least one unit sequence.

12. The method of claim 10, wherein the plurality of base stations comprise the base station and belong to a same operator.

13. The method of claim 10, wherein the plurality of base stations belong to a first operator and the base station belongs to a second operator different from the first operator.

14. The method of claim 10, wherein the signal is detected in a Time Divided Duplexer communication system in any of the following:
    a Downlink Pilot Time Slot;
    an Uplink Pilot Time Slot;
    a Guard Period; and
    a traffic time slot.

15. An apparatus, comprising:
    at least one processor; and
    at least one memory including computer program code;
    the at least one memory and the computer program code are configured to, with the at least one processor, cause the apparatus to perform the method of claim 1.

16. An apparatus, comprising:
    at least one processor; and
    at least one memory including computer program code;
    the at least one memory and the computer program code are configured to, with the at least one processor, cause the apparatus to perform the method of claim 10.

17. A computer program embodied on a non-transitory computer readable medium, said computer program comprising machine-executable instructions, wherein the machine-executable instructions, when being executed, cause a machine to perform the method of claim 1.

18. A computer program embodied on a non-transitory computer readable storage medium, said computer program comprising program instructions which, when executed by an apparatus, cause the apparatus to perform the method of claim 10.

\* \* \* \* \*